(12) United States Patent
Zamkoff et al.

(10) Patent No.: US 8,090,690 B2
(45) Date of Patent: Jan. 3, 2012

(54) SYSTEMS AND METHODS FOR DATA UPLOAD AND DOWNLOAD

(75) Inventors: Erik Zamkoff, Fairfield, CT (US); Jeff Speigel, Walnut Creek, CA (US); Frederick Clark, New York, NY (US); Christopher Giordano, New York, NY (US)

(73) Assignee: MiMedia LLC, Port Chester, NY (US)

( * ) Notice: Subject to any disclaimer, the term of this patent is extended or adjusted under 35 U.S.C. 154(b) by 301 days.

(21) Appl. No.: 12/473,128

(22) Filed: May 27, 2009

(65) Prior Publication Data
US 2010/0306267 A1    Dec. 2, 2010

(51) Int. Cl.
G06F 17/30 (2006.01)
G06F 13/28 (2006.01)

(52) U.S. Cl. .......................... 707/640; 711/162
(58) Field of Classification Search .................. 707/640, 707/642, 650, 661, 667–671
See application file for complete search history.

(56) References Cited

U.S. PATENT DOCUMENTS

| | | | |
|---|---|---|---|
| 5,835,953 A | 11/1998 | Ohran | |
| 5,926,624 A * | 7/1999 | Katz et al. | 709/217 |
| 7,509,684 B2 * | 3/2009 | McDonald et al. | 726/26 |
| 2002/0083366 A1 | 6/2002 | Ohran | |
| 2002/0133387 A1 * | 9/2002 | Wilson et al. | 705/8 |
| 2003/0055671 A1 * | 3/2003 | Nassar | 705/1 |
| 2004/0236859 A1 * | 11/2004 | Leistad et al. | 709/230 |
| 2006/0015637 A1 * | 1/2006 | Chung | 709/232 |
| 2006/0179079 A1 | 8/2006 | Kolehmainen | |
| 2006/0230440 A1 * | 10/2006 | Wu et al. | 726/9 |
| 2006/0277123 A1 * | 12/2006 | Kennedy et al. | 705/35 |
| 2006/0288168 A1 * | 12/2006 | Stevenson | 711/115 |
| 2007/0106714 A1 * | 5/2007 | Rothbarth | 707/204 |
| 2007/0296581 A1 * | 12/2007 | Schnee et al. | 340/572.1 |
| 2008/0022058 A1 | 1/2008 | Nadathur et al. | |
| 2008/0060069 A1 * | 3/2008 | Vindici | 726/21 |
| 2008/0082678 A1 * | 4/2008 | Lorch et al. | 709/230 |
| 2008/0222734 A1 * | 9/2008 | Redlich et al. | 726/26 |
| 2008/0306872 A1 * | 12/2008 | Felsher | 705/51 |
| 2009/0024675 A1 * | 1/2009 | Hewitt et al. | 707/204 |

OTHER PUBLICATIONS

International Search Report and Written Opinion issued for PCT/US2010/036105, dated Jul. 13, 2010, 12 pages.

* cited by examiner

*Primary Examiner* — Robert Timblin
(74) *Attorney, Agent, or Firm* — Fulbright & Jaworski L.L.P.

(57) ABSTRACT

Systems and methods which provide a hybrid network based solution for digital data file backup are shown. Embodiments utilize a transport mass storage system to provide transmission of digital data files between user equipment and a network based mass storage system. A manifest may be used to manage transporting and/or storage of digital data files. User equipment may then access the digital data files stored to the network mass storage system for various purposes using a network link. Subsequent, incremental backups and other transfers of relatively small amounts of digital data files are preferably accomplished using a network link for the transfer.

16 Claims, 3 Drawing Sheets

SYSTEMS AND METHODS FOR DATA UPLOAD AND DOWNLOAD

TECHNICAL FIELD

The present invention relates generally to data transmission and, more particularly, to techniques for data upload and/or download.

BACKGROUND OF THE INVENTION

The amount of data stored digitally has increased dramatically in recent years. In addition to the more traditional data files utilized by computing systems, such as the nearly ubiquitous personal computers (PCs), various forms of media have now begun to be commonly stored in digital form. For example, digital photographs have all but replaced traditional film based photographs. Likewise, digital music files have become the predominant form for transmission, distribution, and storage of music content. Multimedia files, containing sound and images, have become readily accepted as a preferred way to transmit, distribute, and store content such as commercial and home movies. Accordingly, it is not unusual for even a casual user of technology to amass a large collection of digital files, perhaps including digital photos, digital music, digital movies, databases, office productivity files, etc. Similarly, businesses, including small businesses and home based businesses, have large amounts of digital files.

In order to accommodate the storage of such digital files, a typical PC system of today generally includes a mass storage system (e.g., hard disk drive) providing 200-300 gigabytes or more of storage. Similarly, other devices which utilize digital data files typically include, or have associated therewith, large mass storage systems. For example, it is not uncommon for personal entertainment systems (PESs), such as a MP3 player or IPOD, personal digital assistants (PDAs), such as a BLACKBERRY or IPAQ, personal communication systems (PCSs), such as an IPHONE or other smartphone, to include 100 gigabytes or more of storage.

Although the intangible nature of such digital data files has provided advantages in transmission, storage, and access to information, their use is not without disadvantage. For example, users have often discovered that such digital data files may be damaged, corrupted, or otherwise lost, thereby preventing access to their data. It is not uncommon for a mass storage system or its host system (e.g., PC, PES, PDA, PCS, etc.) to fail or be damaged to an extent that digital data files are not recoverable. Similarly, such systems may themselves be lost or stolen, taking their digital data files with them. Accordingly, users have begun to realize that implementing some sort of digital data file archiving or duplication process (often referred to as "backup" or "backing up") is important to digital data file security.

A traditional technique for providing digital data file backup is to provide a second, external mass storage system, such as a second hard disk drive of appropriate storage capacity, and make a copy of the digital data files to be backed up on that second mass storage system. This solution has not provided an ideal solution for providing digital data file backup for a number of reasons. For example, the user must acquire, interface, and maintain the duplicate or second mass storage system, which results in added cost and effort. Moreover, the process of identifying the particular digital data files for duplicating on the second mass storage system, managing the duplication process, and periodically supplementing the backed up digital data files with new or modified digital data files is often overwhelming for many users. A further disadvantage of the use of the aforementioned second mass storage system is that it is typically stored with or near the host system it is used to backup. Thus, if the host system is rendered inoperable (e.g., due to fire, electrical surge, lightning strike, computer virus, etc.) or is otherwise unavailable (e.g., due to loss, theft, etc.), the second mass storage system containing the backup digital data files is likewise unavailable or inoperable. Additionally, as with the host system, external mass storage systems are vulnerable to breakage and drive failure, the timing of which is difficult to predict.

A more recent technique for providing digital data file backup is to utilize a network based solution (often referred to as "cloud computing"). For example, a network based mass storage system, such as may be provided by an Internet based storage service, is utilized to provide storage of duplicate copies of digital data files. A host system provided with an appropriate network connection may thus upload a copy of the digital data files to be backed up to the network based mass storage system through the network. This technique has the advantage of providing additional mass storage without the user having to acquire and maintain a second mass storage system. Such a network based system also provides a higher level of data security because data is stored offsite, in data centers with redundant and often geo redundant server architectures. Because the additional mass storage is provided in the network "cloud," issues with the backed up digital data files being destroyed, lost, stolen, or otherwise unavailable with the user's host system are mitigated. However, this solution has not provided an ideal solution for providing digital data file backup for a number of reasons. For example, the process of identifying the particular digital data files for duplicating on the second mass storage system, managing the duplication process, and periodically supplementing the backed up digital data files with new or modified digital data files continues to often be overwhelming for many users.

Perhaps the greatest impediment to the use of a network based solution is the time and network resources required for backing up large amounts of digital data files. Typical broadband Internet connections, as would be utilized for a cloud computing backup system, are asymmetrical (e.g., the downlink often provides on the order of 10 times the throughput as the uplink, such as ADSL over plain old telephone service (POTS) lines theoretically providing 12 Mbit/s downlink and 1.3 Mbit/s uplink). Such asymmetrical broadband Internet connections, such as provided by asymmetric digital subscriber line (ADSL) and cable Internet links, readily accommodate the downloading of Internet content (e.g., web pages) and the small amount of uplink data used to navigate and access such Internet content. However, asymmetrical broadband Internet connections do not provide an optimal interface for uploading large amounts of data as is done using a network based digital data file backup solution. For example, the links often do not meet the theoretical throughputs, but rather provide much lower effective throughput, such as due to noisy links, collisions with other network traffic, host computer multitasking, dropped links which must be reestablished, etc. Accordingly, transferring copies of 100 gigabytes of digital data files (an amount which, as discussed above, is not uncommon even for a casual user) to a network based mass storage system using such an asymmetrical broadband Internet connection has been found to often take from 28-30 days.

Such a lengthy transfer of data is not conducive to a good user experience. For example, the use of the host system and/or other system utilized for the data uploading is substantially impacted by the data transfer. Similarly, other systems utilizing the network link (e.g., other PCs linked to the Internet through the same broadband connection) may be negatively impacted by the reduced availability of the network link. If the network link suffers an interruption or other anomaly, the data transfer may halt until the user restarts the data transfer. Such network interruptions are not uncommon, particularly within the number of days required for the data transfer, and can result in appreciable delay between the interruption and the resuming of data transfer. Thus the actual time required for completion of the data transfer may be extended for hours and even days.

Further exacerbating the foregoing disadvantages associated with the use of a network based solution for digital data file backup are the restrictions on network use often implemented by Internet service providers (ISPs) and/or other service providers. Broadband network links are often trunked or otherwise shared among different users or user entities. For example, although ADSL links typically provide a private (unshared) link between the central office (CO) and the customer premise, the link between the CO and the Internet point-of-presence (POP) are typically trunked (shared). Cable internet links are typically shared for all but the last few feet completing the link to the customer premise. Accordingly, ISPs and other service providers (e.g., carriers) have begun implementing caps or limits on data transfer to prevent one or a few users from monopolizing the shared resources to the detriment of other users. Even if such service providers wished to accommodate data transfers for backup purposes, it is difficult for the service providers to distinguish between network consumption for legitimate data backup purposes and the less desirable, but equally network resource intensive, peer-to-peer exchange of music or movie content. Accordingly, service providers have blindly implemented decreases in available bandwidth and/or temporary termination of network links where a user is consuming more than some threshold amount of bandwidth for a period of time. Such restrictions negatively impact the already poor user experience associated with the use of network based solutions for digital data file backup available today.

BRIEF SUMMARY OF THE INVENTION

The present invention is directed to systems and methods which provide a hybrid network based solution for digital data file backup. Embodiments of the invention utilize a transport mass storage system, such as may comprise a hard disk drive, flash memory, and/or other non-volatile mass storage media, to provide transmission of digital data files between user equipment, such as PCs, PESs, PDAs, PCSs, wireless handsets, digital video recorders (DVRs), etc., and a network based mass storage system, such as may be provided by an Internet based storage service. The transport mass storage system is preferably used to physically transport a large volume of digital data files (whether only some or all such digital data files) to be stored, or backed up, to the network mass storage system. User equipment may then access the digital data files stored to the network mass storage system using a network link, such as for data restoring, remote file access, transferring data to a new host, etc. Subsequent, incremental backups (e.g., transfers of modified or added files) and other transfers of relatively small amounts of digital data files may be accomplished using a network link for the transfer.

According to an embodiment of the invention, a user subscribes to a hybrid network based digital data file backup service and is provided a transport mass storage system for physically transporting digital data files to be stored, such as by overnight courier. The transport mass storage system may be configured with an instruction set, such as in the form of software and/or firmware stored in the transport mass storage system, to facilitate copying appropriate digital data files from selected user equipment to the transport mass storage system. Additional or alternative instruction sets and/or other data may be carried by transport mass storage systems of embodiments. For example, user information, such as may be utilized to confirm the identity of the user and/or one or more host systems, to identify digital data files to be backed up, to associate backed up digital data files with the appropriate user, etc., may be stored by a transport mass storage system. Likewise, security information, such as a public cryptographic keys, cryptographic key identifiers, passwords, etc., may be stored by a transport mass storage system. Additional software, such as software to facilitate incremental or other subsequent digital data file backup operations (e.g., using network links for transmitting digital data files), may be transported to the user equipment by a transport mass storage system of embodiments. Alternative embodiments may operate to provide one or more of the foregoing instruction sets and/or other data by means other than a transport mass storage system, such as by downloading instruction sets and/or other data via a network link (e.g., during a registration session).

An instruction set, whether stored by the transport mass storage system of the foregoing embodiment or otherwise available to a host system for which network based digital data file backup services are to be provided, may be configured to "auto-run" or otherwise automatically launch upon interfacing with user equipment. Additionally or alternatively, such an instruction set may be manually initiated or otherwise invoked, as desired. Such an instruction set (e.g., software) may confirm the user's identity and/or that it is interfaced with an expected or appropriate host or hosts (or other source of digital data files). Thereafter, operation of the instruction set may identify digital data files to be backed up, perhaps using some level of input from a user and/or algorithms and data for identifying appropriate data files, and copy the identified digital data files to the transport mass storage system. The digital data files are preferably encrypted or otherwise protected when stored on the transport mass storage system. The foregoing operation in accordance with embodiments essentially results in the backing up of data being a "plug and play" operation.

After the identified digital data files have been copied to the transport mass storage system, the transport mass storage system of the foregoing embodiment is transported to a network based mass storage system portal, such as by overnight courier, for copying to a network based mass storage system. Once the digital data files have been copied to the network based mass storage system, the transport mass storage system of embodiments is processed to remove user data, such as by formatting, overwriting data, etc. and may be subsequently used to provide transportation of other user data. The hybrid network based digital data file backup service may provide a communication to the user, such as by email, voice mail, short message service (SMS), etc., that backing up of the digital data files has been completed and the files are available for use by the user.

Embodiments of the invention utilize a manifest to manage transporting and/or storage of digital data files. For example, during operation identifying digital data files for backing up and/or copying digital data files to a transport mass storage system (e.g., upon a user registering for a network based backup service and/or upon a network based backup service being invoked to backup data), embodiments of the invention may create a manifest including information such as identification of the digital data files backed up, file size information, cryptographic key information, user identification information, host system information, etc. Such a manifest can be stored on the transport mass storage system, along with the digital data files, for use by the hybrid network based digital data file backup service. For example, manifest information may be used to confirm that all the digital data files have been received, to provide a digital record of all files being transported, to provide information with respect to the storage resources needed for the files, to confirm that the files have not been corrupted or altered, to associate the digital data files with the appropriate user's account, etc.

Embodiments of the invention operate to communicate the foregoing manifest electronically, such as through a network link, from the user equipment to the hybrid network based digital data file backup service. For example, a manifest may be communicated electronically upon completion of operation copying the digital data files to the transport mass storage system, such as to facilitate making an appropriate amount of storage in the network based mass storage system available for the later arrival of the transport mass storage system transporting the digital data files. Additionally or alternatively, a manifest transmitted separately from the transport mass storage system may be utilized to provide a digital record of all files being transported, to verify that the digital data files transported by a corresponding transport mass storage system have not been altered, corrupted, etc.

Having stored copies of the user's digital data files to the network based mass storage system of a hybrid network based digital data file backup service, embodiments of the invention facilitate various uses of and operations with the digital data files. For example, the user may from time-to-time supplement the backed up digital data files, such as through regularly scheduled and/or ad hoc incremental digital data file backup operations. Such incremental digital data file backup operations preferably provide for transmission of appropriate digital data files through a network link, although some incremental digital data file backup operations (e.g., those involving a large amount of data or subsequent "full" backup operations) may again utilize a transport mass storage system for transporting some or all digital data files to be backed up. A user may access the digital data files stored by the network based mass storage system, such as to restore data to user equipment, to transfer data to different user equipment, to remotely access data, etc. The hybrid network based digital data file backup service may additionally or alternatively provide operations with respect to the digital data files, such as to organize, catalog, or otherwise manage the files, augment, correct, or otherwise process data of the files, distribute, or copy the files as desired by a user, etc.

Embodiments of the invention may utilize a transport mass storage system for communicating digital data files, for which hybrid network based digital data file backup services are provided, to user equipment in addition to or in the alternative to transporting digital data files from user equipment to a network based mass storage system. For example, where a user desired to restore a large amount of data to user equipment (e.g., user equipment repaired after a mass storage system failure, newly acquired user equipment, user equipment to be provided with a copy of digital data files from another user equipment, etc.), a transport mass storage system may be utilized to transport a large volume of digital data files from the network based mass storage system to the user equipment. One or more file manifest, as described above, may be utilized with respect to such transportation of digital data files, if desired.

It should be appreciated that embodiments of the invention provides for storage of digital data files separately from the host systems used by users, thus providing security in that destruction, loss, or failure of such host systems does not affect the availability or viability of the backup copies of the digital data files. Moreover, operation of hybrid network based digital data file backup services in accordance with embodiments of the invention facilitates transfer of very large amounts of digital data files to a network based mass storage system in a fraction of the time, using less resources, and providing an improved user experience, than that of a purely network based solution.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
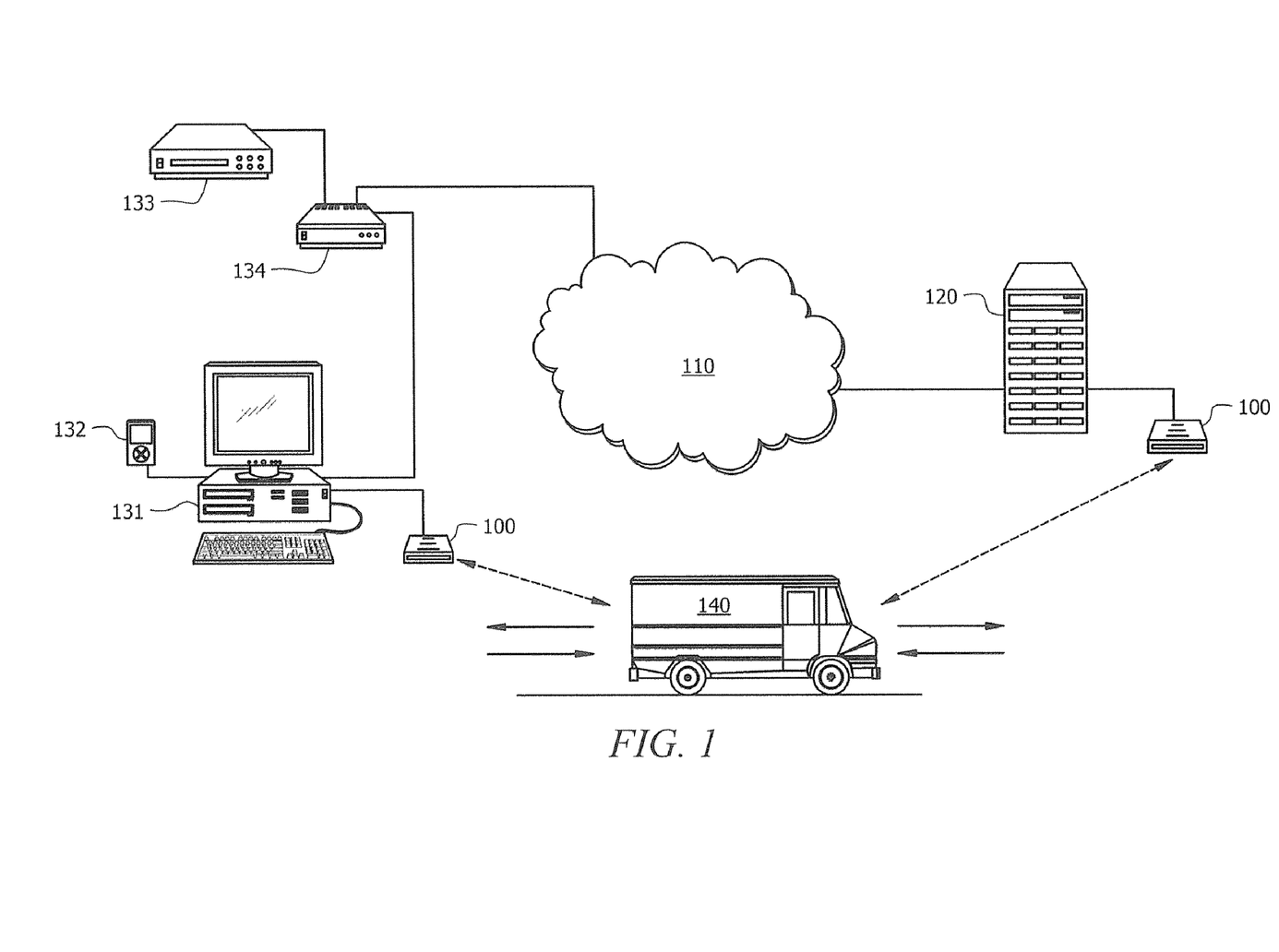
FIG. 1 shows a system adapted to provide hybrid network based backup services according to an embodiment of the invention.

FIG. 1 shows a system adapted to provide a hybrid network based digital data file backup service according to embodiments of the invention. In the embodiment illustrated in FIG. 1, user equipment 131-133 may store large amounts of data in the form of digital data files, such as may comprise digital photos, graphic files, digital music, digital sound recordings, digital videos, multimedia files, databases, program files, calendar files, contacts files, office productivity documents, databases, software, etc. The user equipment storing such data may comprise various system configurations. For example, user equipment 131 may comprise a computer system, such as a PC, notebook computer, network server, etc., having one or more mass storage system associated therewith storing data. User equipment 132 may comprise a portable or handheld system, such as a PES, PDA, PCS, wireless handsets, etc., having one or more mass storage system associated therewith storing data. User equipment 133 may comprise an appliance, such as a DVR, interactive voice response (IVR) system, etc. having one or more mass storage system associated therewith storing data.

Such user equipment may be interconnected for information communication and/or coupled to an external network. For example, the illustrated embodiment includes user equipment 134, such as may comprise a router, switch, gateway, modem, network interface card (NIC), and/or the like, providing communication between various of the user equipment as well as an interface to network 110.

It should be appreciated that user equipment accommodated according to embodiments of the invention may vary in functionality, configuration, number, and topology from that of the illustrated embodiment. For example, although illustrated as interfacing with network 110 through user equipment 134, user equipment 131 and 133 of embodiments may interface directly with network 110 or may interface with network 110 through additional user equipment (not shown). Similarly, although illustrated as interfacing with network 110 through additional user equipment (here, user equipment 131), user equipment 132 may interface with network 110 more directly through user equipment 134 or may interface directly with network 110.

Network 110 of embodiments may comprise one or more network systems, such as the Internet, the public switched telephone network (PSTN), a local area network (LAN), a metropolitan area network (MAN), a wide area network (WAN), a wireless network, a cellular network, a cable transmission system, and/or the like. Network 110 utilized according to embodiments of the present invention provides a broadband network link for use by user equipment 131-134. However, where the user equipment is associated with a home user or small business, it is expected that network 110 provides an asymmetrical network link (e.g., ADSL or cable Internet link), whereby the downlink (from network 110 to user equipment 131-134) provides appreciably greater throughput (e.g., on the order of 10 times, in some instances) than the uplink (from user equipment 131-134 to network 110).

The system illustrated in FIG. 1 further includes network based backup service system 120. Network based backup service system 120 of embodiments includes one or more network based mass storage system adapted to store large amounts of data. For example, although illustrated as a single unit, embodiments of network based backup service system 120 may comprise any number of units, whether disposed locally or remotely with respect to one another, providing network communication, data storage, and other functionality as described herein.

Although a user of user equipment 131-133 may desire to backup digital data files associated with any or all of user equipment 131-133 using network based backup service system 120, the available network links to network 110 may prevent or otherwise frustrate transmission of the digital data files through network 110. For example, transferring copies of 100 gigabytes of digital data files to a network based mass storage system of network based backup service system 120 using an asymmetrical broadband Internet connection may take from 28-30 days, such as due to limited transfer rates, noisy media, network data collisions, network link interruptions, etc. Moreover, service providers (e.g., ISPs and carriers) have implemented decreases in available bandwidth and/or temporary termination of network links where a user is consuming more than some threshold amount of bandwidth for a period of time in order to prevent one user from consuming an unfair amount of bandwidth shared among a plurality of users. Accordingly, embodiments of the present invention implement a hybrid network based backup service in which a transport mass storage system (transport mass storage system 100) is used to physically transport (e.g., using transportation service 140) a large volume of digital data files to be stored by a network mass storage system of network based backup service system 120.

Transport mass storage system 100 of embodiments comprises a non-volatile high capacity (e.g., 200 gigabyte to 2 terabyte) mass storage system having one or more interfaces for coupling to various user equipment. Non-volatile, as used herein, encompasses various configurations of stable memory, whether providing passively persistent storage (e.g., magnetic storage media, optical disk media, flash memory media, etc.) or actively persistent storage (e.g., CMOS SRAM powered by a battery, etc.). Additionally, transport mass storage system 100 is preferably provided in a relatively small form factor (e.g., the size of a compact disk (CD) jewel case, the size of a package of cigarettes, the size of a modern cellular telephone, etc.) and is adapted to be sufficiently rugged to endure shipment as described herein without loss of data. For example, transport mass storage system 100 may comprise a high capacity hard disk drive having one or more standardized interfaces, such as a universal serial bus (USB), Institute of Electrical and Electronics Engineers (IEEE) 1394 (FIREWIRE) interface, Ethernet interface, Personal Computer Memory Card International Association (PCMCIA) interface, peripheral component interconnect (PCI) interface, small computer system interface (SCSI), APPLE IPOD/IPHONE dock interface, and/or the like. Alternatively, transport mass storage system 100 may comprise a high capacity flash memory device, such as a USB flash drive, a secure digital (SD) memory card, an extreme digital (XD) memory card, compact flash (CF) memory card, and/or the like. Embodiments of transport mass storage system 100 may comprise multiple forms of memory, such as hard disk memory, flash memory, dynamic memory, optical memory, and/or read only memory.

Transport mass storage system 100 of embodiments comprises a processor-based system (e.g., having a central processing unit (CPU), memory, operating system, etc.) operable to execute an instruction set to provide functionality as described herein (e.g., to identify digital data files to be backed up, to copy digital data files from user equipment, to generate a digital data file manifest, to communicate with a network based backup service system, to verify host user equipment and/or user identify, etc.). For example, transport mass storage system 100 may comprise a disk drive or other mass storage system having processor-based circuitry integrated therewith to provide autonomous control with respect to the operation of transport mass storage system 100.

As will be better understood from the discussion below, transport mass storage system 100 of embodiments comprises material in addition to memory for storing digital data files being backed up. For example, transport mass storage system 100 of embodiments includes one or more instruction set (e.g., software, firmware, etc.) useful in providing network based backup services as described herein. Such instruction sets may be stored by transport mass storage system 100 for downloading to and/or execution by host user equipment. Alternative embodiments of transport mass storage system 100 may comprise no such instruction set, such as where such instruction sets are provided to a host computer via other means, such as by network link, etc.

It should be appreciated that transport mass storage system 100 may be part of a pool of a plurality of transport mass storage systems used by a network based backup service. Such a pool of transport mass storage systems may comprise any number of transport mass storage systems suitable for serving subscribers to the network based backup service. Such transport mass storage systems are preferably reusable, such as by implementing data purging techniques (described in further detail below), to provide service with respect to a plurality of different subscribers. Alternative embodiments may uniquely associate a particular transport mass storage system with a particular subscriber account so as to avoid even the appearance that a subscriber's data might remain available to a different subscriber through subsequent use of the transport mass storage system. Another alternative embodiment of the invention may provide single use transport mass storage systems, such that the transport mass storage system is discarded or destroyed after its use by a subscriber.

Figure 2:
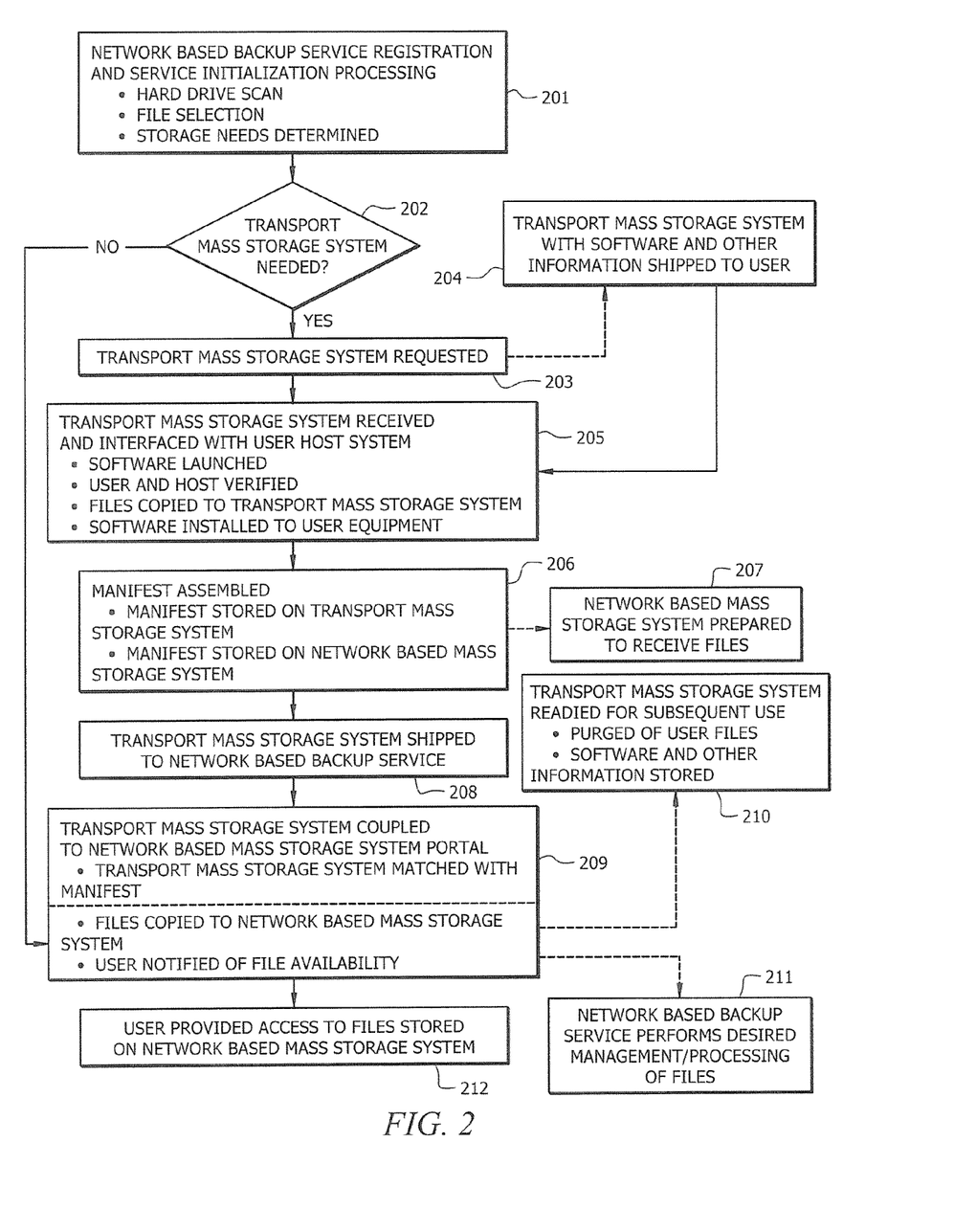
FIG. 2 shows a flow diagram of operation to provide hybrid network based backup services according to an embodiment of the invention.

FIG. 2 shows a flow diagram outlining operation to provide hybrid network based digital data file backup services according to embodiments of the invention. Operation in accordance with the flow diagram of FIG. 2 will be described with reference to the system of FIG. 1 in order to aid the reader in understanding the concepts of the present invention. However, it should be appreciated that the functions of the illustrated flow diagram may be performed using system configurations differing from that illustrated in FIG. 1.

At block 201 of FIG. 2, network based backup service registration and service initialization processing is performed. For example, a user of any of user equipment 131-133 may have elected to subscribe to a network based backup service facilitated by network based backup service system 120. The user may thus operate user equipment, such as user equipment 131, to access network based backup service system 120 to subscribe to the service. Network based backup service system 120 may interface with the user equipment, and thus the user, in various ways, such as by serving a web page and/or downloading software through network 110 to user equipment 131 for performing registration and service initialization. Although the flow diagram is described herein with reference to a user utilizing user equipment 131 to simplify the discussion, it should be appreciated that different and additional user equipment may be operated as described herein.

Various information may be obtained in the registration and service initialization processing, such as user identification, user address, password, level of service desired, service preferences (e.g., default file backup, user selected file backup, file types to be backed up, periodicity of incremental backups, etc.), method of payment (e.g., credit card information, electronic funds transfer information, etc.), identification of user equipment to be served, an operating system or operating systems used by the user equipment to be backed up, configuration information regarding the user equipment to be backed up, physical location of user equipment to be served, file management/processing to be provided by the network based backup service, and/or the like. Such information may be queried from the user, automatically gathered/determined, and combinations thereof. For example, an instruction set performing registration and service initialization processing may analyze user equipment accessible through the user equipment currently in use by the user in order to query the user as to which user equipment backup services are to be provided.

The foregoing information may be utilized in various ways for facilitating network based backup services. For example, user identification and password information may be subsequently utilized to identify a user as an appropriate user of network based backup services. Information identifying user equipment to be served may be subsequently utilized to verify that mass storage systems of appropriate user equipment are being backed up, restored, etc. Such information may be stored by systems of the network based backup service, by user equipment, etc. For example, a small parcel of data (e.g., a "cookie") containing information useful in facilitating hybrid network based backup services (e.g., user identification, password, user equipment identification, etc.) may be provided to user equipment 131 for later use, such as when files are to be copied to transport mass storage system 100.

In accordance with a preferred embodiment, an analysis is performed with respect to the user equipment to be backed up in order to determine how the network based backup service is to be provided. For example, the user may be queried as to the types of files to be backed up (e.g., digital photos, digital movies, digital music, etc.), the approximate or average size of the files, and/or the approximate number of such files, such as where the particular user equipment to be backed up is not the user equipment used to perform the registration or is otherwise not in communication with the user equipment used to perform the registration. Alternatively, an instruction set performing registration and service initialization processing may scan the appropriate user equipment mass storage systems to determine the types of files to be backed up, the sizes of the files, the approximate number of such files, the particular files to be backed up, etc., such as where the particular user equipment to be backed up is the user equipment used to perform the registration or is otherwise in communication with the user equipment used to perform the registration. Storage needs for the digital data files to be backed up are preferably determined using the foregoing or similar information.

Analysis in addition to or in the alternative to analysis of the aforementioned file information may be performed according to embodiments of the invention. For example, an instruction set performing registration and service initialization processing may analyze network links available to the user equipment in order to determine an approximate or average throughput available for file transfer and other operations.

At block 202 of the illustrated embodiment a determination is made as to whether transport mass storage system 100 is to be utilized to transport the digital data files to be backed up. For example, where the storage needs for the digital data files to be backed up exceeds a particular storage threshold value (e.g., greater than 10 gigabytes), where the digital data files to be backed up would require longer than a particular transfer threshold time (e.g., greater than 24 hours) to be transmitted through network 110, the available network link or links provide uplink throughput below a particular threshold value (e.g., less than 5 Mbit/s), etc., operation according to embodiments of the present invention may determine that transport mass storage system is needed to transport the digital data files. Additionally or alternatively, a user may be presented with information, such as an estimate of the storage needs for the digital data files to be backed up, an estimate of the time to transmit the digital data files through network 110, etc., and allowed to select whether transport mass storage system 100 is to be used to transport the digital data files.

If it is determined at block 202 that transport mass storage system 100 is not to be used to transport the digital data files, processing according to the illustrated embodiment proceeds to block 209 wherein the digital data files meeting the user's backup preferences are transmitted to a network based mass storage system of network based backup service system 120 through network 110. However, if it is determined that transport mass storage system 100 is to be used to transport the digital data files, processing according to the illustrated embodiment proceeds to block 203.

At block 203 of the illustrated embodiment a transport mass storage system is requested for use in transporting digital data files between the user equipment and the network based backup service system. For example, an instruction set performing registration and service initialization processing may cause user equipment 131 to send a message to network based backup service system 120 through network 10 requesting that transport mass storage system 100 be shipped to the user. In response, at block 204 of the illustrated embodiment, transport mass storage system 100 is configured and shipped to the user.

Configuration of transport mass storage system 100 according to embodiments of the invention includes storing appropriate software and/or other information thereto for use in providing hybrid network based backup services. For example, information identifying user equipment for which digital data files are to be backed up may be stored to transport mass storage system 100 for use in verifying subsequently interfaced host user equipment. Similarly, information identifying an appropriate user may be stored to transport mass storage system 100 for use in subsequently verifying the user. User preferences and operation configuration information, cryptographic key information, and/or other information to facilitate backing up of digital data files as described herein may additionally or alternatively be stored to transport mass storage system 100.

Configuration of transport mass storage system 100 of embodiments may additionally or alternatively operate to associate the particular transport mass storage system 100 with the particular user, subscriber account, user equipment, etc. For example, an electronic serial number (ESN) or other unique identifier of the transport mass storage system may be associated with the user, subscriber account, and/or user equipment in the network based backup service system so that digital data files returned using the transport mass storage system (as identified using the unique identifier of the transport mass storage system) are properly associated with the user, subscriber account, and/or user equipment. Such unique information may additionally or alternatively be provided to the user equipment, such as part of the aforementioned cookie, to facilitate operation of digital data file backup at the user equipment to provide copies of digital data files only to a properly paired transport mass storage system.

It should be appreciated that transport mass storage system 100 provides a mass storage system capable of carrying large amounts of data to user equipment as well as from user equipment. Accordingly, preferred embodiments store software to transport mass storage system 100 for use in providing hybrid network based backup services and/or to update or add features to user equipment, and thus avoid more time consuming download of such through network 100. For example, initial backup software, incremental backup software, software updates, and/or the like may be stored and transported to user equipment by transport mass storage system 100. Additionally or alternatively, such initial backup software, incremental backup software, software updates, etc. may be provided to user equipment via other means, such as transmission via a network link by an instruction set performing the aforementioned registration and service initialization processing.

The aforementioned initial backup software of embodiments is operable to verify a user, to verify user equipment, to identify digital data files to be backed up, to copy digital data files to transport mass storage system 100, to generate a manifest to manage transporting and/or storage of digital data files, to store a generated manifest to transport mass storage system 100, to transmit a generated manifest to a network based backup service system, to install software and/or software updates on user equipment, etc. Incremental backup software of embodiments is preferably installed to user equipment by initial backup software and is subsequently operable to periodically (e.g., once a day, once a week, twice a month, etc.) and/or trigger (e.g., upon a threshold amount of data having been added/changed, upon a threshold number of files having been added/changed, upon particular files/file types having been added/changed, etc.) initiate digital data backup to a network based mass storage system, whether using internet 110 and/or transport mass storage system 100. Software updates may be installed to user equipment by initial backup software to provide updates to user equipment operating systems, software, etc.

Various configurations of user equipment, including different computing platforms (e.g., WINDOWS, MAC OS, UNIX, LINUX, etc.) are accommodated according to embodiments of the invention. Accordingly, configuration of transport mass storage system 100 to store software and/or other information thereto according to embodiments of the invention may analyze information regarding the user equipment in order to identify appropriate software and other information. For example, information regarding identification of user equipment to be served, an operating system or operating systems used by the user equipment to be backed up, and configuration information regarding the user equipment to be backed up obtained in the network based backup service registration and service initialization processing (block 201) may be utilized to identify appropriate software and/or other information for storing to transport mass storage system 100. It should be appreciated that such appropriate software and/or other information may not be restricted to that which is directly useful in providing network based backup services. For example, the analysis of user equipment may determine that software updates are available for one or more user equipment and thus provide the appropriate software update for transporting by transport mass storage system 100 merely to provide the update to the user without the user having to actively download the update using network 110.

Transport mass storage system 100 of the illustrated embodiment is shipped using transportation service 140, such as to the user's address, the physical location of the user equipment, etc. Transportation service 140 preferably comprises an overnight or express courier, such as FEDERAL EXPRESS, DHL, UNITED PARCEL SERVICE, UNITED STATES POSTAL SERVICE EXPRESS MAIL, and/or the like, to facilitate rapid delivery of transport mass storage system 100. Of course, other shipping or delivery services may be utilized according to embodiments of the invention, if desired. Moreover, embodiments of the invention may provide for local availability of transport mass storage systems, such as to minimize the time to provide a subscriber with a transport mass storage system. For example, one or more "depots" may be established in various metropolitan areas, such as at chain electronics stores (e.g., BEST BUY, FRY'S ELECTRONICS, OFFICE MAX, OFFICE DEPOT, etc.), where one or more transport mass storage system is made available for use by subscribers to the network based backup service. Accordingly, rather than shipping transport mass storage system 100 to the user at block 204, a local address at which transport mass storage system 100 is available for pickup may be provided to the user. Of course, a delivery service may be utilized to transport a transport mass storage system from such as local depot, if desired. As a transport mass storage system is used from such a local depot, a replacement transport mass storage system may be provided to the local depot by the network based backup service.

Irrespective of how a particular transport mass storage system is provided to the user, preferred embodiments of the invention provide for the return of the transport mass storage system to the network based backup service for copying digital data files to a network based mass storage system. According to embodiments of the invention, transport mass storage system is provided to a user with return packaging and shipping label. For example, a prepaid overnight or express courier label may be provided to provide expeditious return of transport mass storage system to the network based backup service.

At block 205 of the illustrated embodiment transport mass storage system 100 is received or otherwise obtained by the user. The user preferably interfaces transport mass storage system 100 with one or more host user equipment, such as user equipment having mass storage systems to be backed up, user equipment in communication with user equipment having mass storage systems to be backed up, etc. Interfacing transport mass storage system 100 preferably involves a simple "plug-in" interface, such as through connecting a standard cable (e.g., USB, FIREWIRE, Ethernet, SCSI, APPLE IPOD/IPHONE dock interface, etc.) between host user equipment and transport mass storage system 100. Embodiments may involve a user installing transport mass storage system 100 in an externally available slot on host user equipment (e.g., PCMCIA, SD memory slot, XD memory slot, CF memory slot, etc.) or in an internally available slot on host user equipment (e.g., PCI bus, etc.).

Once transport mass storage system 100 is interfaced with host user equipment, an instruction set (e.g., software) is preferably launched to control operation in accordance with the concepts of the present invention. For example, upon detecting transport mass storage system 100 having been interfaced, an operating system of the host user equipment may "auto run" or otherwise automatically launch software stored on transport mass storage system 100 to control aspects of digital data file backup. Additionally or alternatively, a processor of transport mass storage system 100 may execute software stored thereon to control aspects of digital data file backup. Of course, a user may manually initiate such software, whether stored on transport mass storage system 100, the host user equipment, or on a system of network 110.

Operation of digital data file backup at the user equipment is preferably controlled to verify that an appropriate user is invoking the process. For example, initial backup software controlling the operation may query a user for identification and password. The user's response may be verified against previously submitted information, such as may be stored to user equipment 131 (e.g., using a cookie) and/or a network based backup service system during the network based backup service registration and service initialization processing, stored to transport mass storage system 100 during configuration, etc. Additionally or alternatively, initial backup software controlling the operation of digital data file backup may verify that appropriate user equipment is in communication, whether directly or indirectly, with transport mass storage system 100. For example, the software may compare user equipment information with user equipment information stored to user equipment 131 (e.g., using a cookie) and/or a network based backup service system during the network based backup service registration and service initialization processing, stored to transport mass storage system 100 during configuration, etc. Particular user equipment may be associated with particular transport mass storage systems, such as using the above described transport mass storage system unique identifier.

Continuing with operation at block 205 of the illustrated embodiment, assuming the user and/or user equipment are successfully verified, digital data files to be backed up are identified for copying from the user equipment to transport mass storage system 100. For example, operation of the initial backup software at the user equipment may identify particular digital data files for backup and/or not to be backed up from information obtained during the mass storage system scan of the network based backup service registration and service initialization processing (block 201). Additionally or alternatively, initial backup software controlling digital data file backup operation may scan the appropriate user equipment mass storage systems to determine the types of files to be backed up, the sizes of the files, the number of such files, the particular files to be backed up, etc.

Particular digital data files to be backed up and/or not to be backed up may be identified in a number of ways. Default operation of the initial backup software may scan one or more user equipment mass storage system to identify digital data files of particular file types (e.g., digital photographs, digital videos, digital music, databases, calendar files, contacts files, office productivity processing files, etc.), such as by file extensions, metadata, etc., digital data files stored in particular file folders or directories (e.g., "my documents" folder, "my photos" folder, "/usr/data" directory, etc.), digital data files having a threshold file size, etc. User preference information, such as may have been provided in network based backup service registration and service initialization processing (block 201) or as may be queried from the user, may additionally or alternatively be utilized to identify particular digital data files for backing up and/or not to be backed up. For example, user preferences regarding the particular files, file types, etc. may be utilized by the initial backup software when scanning user equipment mass storage systems for file types, file folders or directories, file sizes, to identify a subset of digital data files meeting the scanning criteria which the user desires to be backed up and/or not to be backed up.

A user may additionally or alternatively provide input to select, whether individually or by type, category, etc., digital data files for backing up and/or not to be backed tip. For example, operation of the initial backup software may query a user as to whether a default digital data file backup, a user specified digital data file criteria digital data file backup, a uniquely identified digital data file backup, or a combination thereof should be performed. Accordingly, a user is enabled to essentially perform a "plug-and-play" backup using the default settings or to control the backup to varying levels of granularity and specificity.

In operation according to preferred embodiments, digital data files stored on mass storage systems of user equipment identified for backing up are copied from the user equipment to transport mass storage system 100. For example, transport mass storage system 100 of the illustrated embodiment is interfaced directly with user equipment 131. Accordingly, digital data files stored on a mass storage system of user equipment 131 may be identified and copied to transport mass storage system 100. It should be appreciated that copying of such digital data files via direct connection to the user equipment may be accomplished in relatively little time (e.g., on the order of 1-2 hours for 100 gigabytes, rather than 28-30 days for 100 gigabytes to be transmitted through an asynchronous network link of network 110).

The digital data files are preferably stored on transport mass storage system 100 in a secure manner. For example, the digital data files of a preferred embodiment are encrypted, such as by operation of the initial backup software, prior to their storage on transport mass storage system 100. A cryptographic key or cryptographic key information, such as may be provided during network based backup service registration and service initialization processing (block 201) or stored on transport mass storage system 100, may be utilized to encrypt the digital data files. According to a preferred embodiment, a public cryptographic key is used to encrypt the digital data files, whereby a corresponding private cryptographic key held by the network based backup service is used to decrypt the digital data files for storage on a network based mass storage system and/or subsequent use.

Transport mass storage system 100 of the illustrated embodiment is in communication, albeit indirectly, with user equipment 132-134. Accordingly, digital data files stored on a mass storage system of user equipment 132 and/or 133 may additionally or alternatively be identified and copied to transport mass storage system 100, such as through user equipment 131 and/or 134. Of course, transport mass storage system 100 of embodiments may be coupled directly to other and different user equipment, such as to couple directly to any of user equipment 132-134.

Operation of the illustrated embodiment at block 205 is not limited to copying digital data files from user equipment mass storage systems. Accordingly, embodiments of the invention operate to copy one or more digital data files from transport mass storage system 100 to appropriate user equipment. For example, initial backup software may operate to install software, software updates, and other information onto user equipment. According to a preferred embodiment of the invention, initial backup software operates to install incremental backup software to user equipment for controlling subsequent operation of the user equipment to periodically and/or trigger initiate digital data backup to a network based mass storage system. Additionally or alternatively, software updates may be installed to user equipment by initial backup software to provide updates to user equipment operating systems, software, etc.

At block 206 of the illustrated embodiment a manifest to manage transporting and/or storage of digital data files. For example, during operation identifying digital data files for backing up and/or copying digital data files to a transport mass storage system, the initial backup software may operate to create a manifest including information such as identification of the digital data files backed up, file size information, cryptographic key information, user identification information, host system information, a number of files being transferred, a location of storage on the user equipment of each file being transferred, file types for the files being transferred, etc., as represented by manifest 300 of FIG. 3. Manifest 300 of embodiments is preferably stored on transport mass storage system 100, along with the digital data files, for use by the network based digital data file backup service. For example, manifest information may be used to confirm that all the digital data files have been received, to provide a digital record of all files being transported, to provide information regarding the storage needed for the files, to confirm that the files have not been corrupted or altered, to associate the digital data files with the appropriate user's account, etc.

Figure 3:
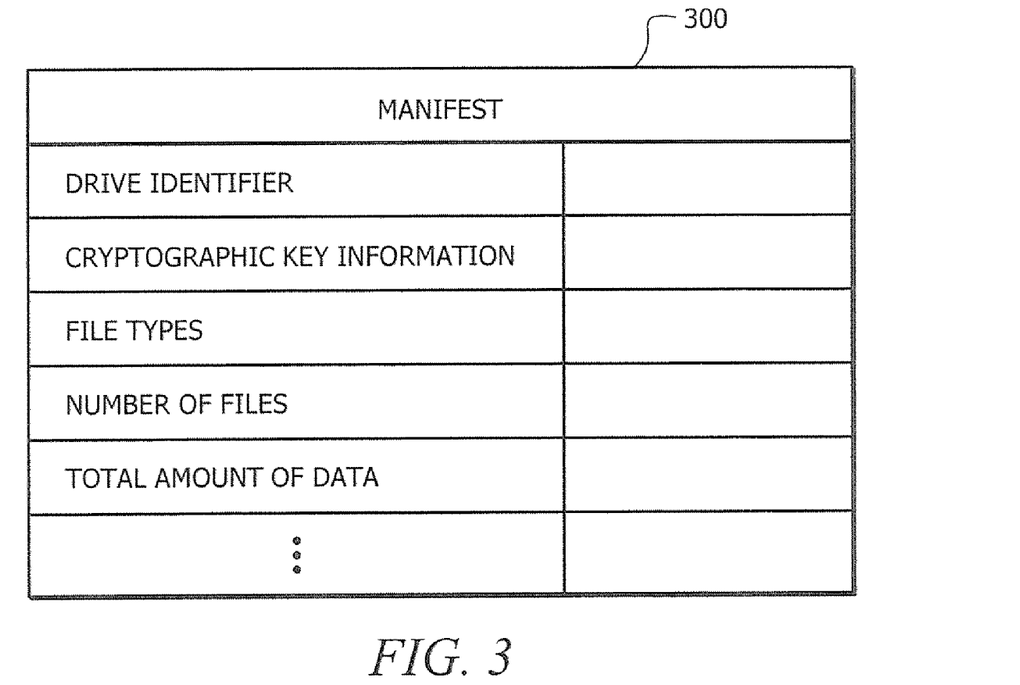
FIG. 3 shows a file manifest as may be used by a hybrid network based backup service system of an embodiment of the invention.

Embodiments of initial backup software additionally or alternatively operate to communicate the foregoing manifest electronically, such as through network 110, from the user equipment (e.g., user equipment 131) to network based backup service system 120. For example, manifest 300 may be communicated electronically upon completion of operation copying the digital data files to transport mass storage system 100. Manifest 300, as electronically communicated to network based backup service system 120, is used in the illustrated embodiment to facilitate making an appropriate amount of storage in a mass storage system of network based backup system 120 available for the later arrival of transport mass storage system 100 transporting the digital data files at block 207. Additionally or alternatively, manifest 300 transmitted separately from transport mass storage system 100 may be utilized to provide a digital record of all files being transported, to verify that the digital data files transported by transport mass storage system 100 have not been altered, corrupted, etc.

The manifest is preferably stored on transport mass storage system 100 and/or transmitted through network 110 in a secure manner. For example, manifest 300 of a preferred embodiment is encrypted, such as by operation of the initial backup software, prior to its storage on transport mass storage system 100 or transmission through network 110.

At block 208 of the illustrated embodiment transport mass storage system 100 is shipped using transportation service 140, such as to the physical location of network based backup system 120, a nearest network based backup service mass storage system portal, etc. Transportation service 140 used in transporting transport mass storage system 100 preferably comprises an overnight or express courier, such as FEDERAL EXPRESS, DHL, UNITED PARCEL SERVICE, UNITED STATES POSTAL SERVICE EXPRESS MAIL, and/or the like, to facilitate rapid delivery of transport mass storage system 100. Of course, other shipping or delivery services may be utilized according to embodiments of the invention, if desired. Moreover, a different transportation service and/or type of service may be utilized when transporting transport mass storage system 100 to network based backup system 120 than may have been used when transporting transport mass storage system 100 to the user.

It should be appreciated, however, that the use of express courier services as transportation service 140 both to and from network based backup system 120 may result in the transportation of digital data files to the network based backup service in as little as 2 days from a subscriber's initial registration for the service. Where the above mentioned local depot service is utilized with respect to transport mass storage system 100, transportation of digital data files to the network based backup service may be accomplished in as little as 1 day from a subscriber's initial registration for the service. Of course, where same-day transportation services are utilized, these times may be reduced even further. Nevertheless, any of the foregoing, as well as even much slower transportation services, result in large volume digital data files (e.g., 20 gigabytes or greater) being provided to the network based backup service system in appreciably less time than if network 110 were used for their transmission.

At block 209 of the illustrated embodiment transport mass storage system 100 is received by the network based backup service. Transport mass storage system 100 is preferably interfaced with network based backup system 120 for copying files to a network based mass storage system thereof. The foregoing interfacing of transport mass storage system 100 with network based backup system 120 may involves a plug-in interface, such as through connecting a standard cable (e.g., USB, FIREWIRE, Ethernet, SCSI, APPLE IPOD/IPHONE dock interface, etc.) between a portal of network based backup system 120 and transport mass storage system 100, installing transport mass storage system 100 in an externally available slot on a system of network based backup system 120 (e.g., PCMCIA, SD memory slot, XD memory slot, CF memory slot, etc.), or installing transport mass storage system 100 in an internally available slot on a system of network based backup system 120 (e.g., PCI bus, etc.).

Once transport mass storage system 100 is interfaced with network based backup system 120, an instruction set (e.g., software) of network based backup system 120 preferably associates the digital data files with an appropriate user, subscriber account, and/or user equipment. For example, software of network based backup system 120 may access unique identifier information (e.g., ESN) of transport mass storage system for determining which subscriber account the digital data files transported by transport mass storage system 100 are associated with. The unique identifier information may have been stored in associate with the user account when transport mass storage system 100 upon dispatch to the user. Additionally or alternatively, the subscriber account may be identified by reference to the manifest.

Manifest information, as provided by manifest 300, may be used to confirm that all the digital data files have been received, that the files have not been corrupted or altered, to associate the digital data files with the appropriate user's account, etc. For example, digital data files stored on transport mass storage system 100 may be analyzed and the data from such analysis compared to data in manifest 300, as received electronically or as stored on transport mass storage system 100, to determine if there are discrepancies indicative of the digital data files having been corrupted or altered. Similarly, manifest 300 as received electronically and as stored on transport mass storage system 100 may be compared to determine if there are any discrepancies indicative of the digital data files or manifest having been corrupted or altered.

Assuming transport mass storage system 100 is properly associated with a subscriber account or otherwise identifiable to a user or user equipment, and the digital data files transported thereby are not corrupted or otherwise undesirably altered, the illustrated embodiment operates to copy digital data files stored transport storage system 100 to mass storage systems of network based backup system 120. The digital data files are preferably stored on a mass storage system of network based backup system 120 in a manner to facilitate access by a user via network 110. For example, the mass storage systems of network based backup system 120 may provide a virtual mass storage system for user equipment 131-133 upon which the digital data files are provided in a hierarchy or directory structure native to the user equipment. Digital data file hierarchical and/or directory structure data with respect to the digital data files may be provided to network based backup system 120 using manifest 300.

The digital data files are preferably stored on transport mass storage system 100 in a secure manner for transportation. Accordingly, embodiments operate to decrypt the digital files, such as by operation of software of network based backup system 120, prior to their storage on a mass storage system of network based backup system 120. An appropriate cryptographic key may be identified for use in the foregoing decryption using a cryptographic key or cryptographic key information stored in manifest 300, or otherwise identified with the digital data files to be backed up. According to a preferred embodiment, a public cryptographic key is used to encrypt the digital data files, thus a corresponding private cryptographic key held by the network based backup service may be used to decrypt the digital data files for storage on a network based mass storage system and/or subsequent use.

Embodiments of the invention operate to confirm that the digital data files transported by the transport mass storage system are up-to-date, or otherwise represent the then current state of files desired to be backed up by a user. For example, embodiments of the invention operate such that network based backup system 120 communicates with user equipment corresponding to the files transported by transport mass storage system 100, such as using network 110, to determine if any new files meeting the backup criteria have been added to the user equipment mass storage system, any of the files transported have been altered as stored by the user equipment mass storage system, etc. after the copying the files from the user equipment mass storage system to the transport mass storage system. Such embodiments operate to update the files copied to the network based storage system to include such changes to the files stored by the user equipment mass storage system by transporting the updates through network 110.

Continuing with operation at block 209 of the illustrated embodiment, network based backup system 120 preferably provides a communication to the user, such as by email, voice mail, etc., that backing up of the digital data files has been completed and the files are available for use by the user. Such or similar communication may additionally or alternatively serve to notify systems and/or software (e.g., user equipment, incremental backup software, etc.) that the digital data files are available on network based backup system 120, the particular location the digital data files are located on mass storage systems of network based backup system 120, how to access the digital data files stored on mass storage systems of network based backup system 120, and/or the like.

Having copied the digital data files to be backed up from transport mass storage system 100 to mass storage systems of network based backup system 120, embodiments of the invention operate to purge or otherwise remove user data from transport mass storage system 100 at block 210. An instruction set (e.g., software) of network based backup system 120 or of a processor-based embodiment of transport mass storage system 100 may operate to format, overwrite, etc. the mass storage of transport mass storage system 100. For example, one or more data pattern may be written over all memory locations of transport mass storage system 100 (or all memory locations having had user data stored therein) to purge the memory of all user data. Having purged transport mass storage system 100 of user data, transport mass storage system 100 may be returned to a pool of transport mass storage systems for subsequent use to provide transportation of other user data, perhaps with various network based backup service software and/or other material stored or refreshed thereon.

Systems of network based backup system 120 may provide more than storage of the digital data files, as shown in block 211 of the illustrated embodiment. Network based backup system 120 of embodiments may operate to organize, catalog, or otherwise manage the digital data files. For example, software of network based backup system 120 may analyze the digital data files (e.g., using optical character recognition, voice recognition, image recognition, etc.), metadata associated with the digital data files, and/or the like to organize files into albums. Additionally or alternatively, network based backup system 120 may operate to augment, correct, or otherwise process data of the digital data files. For example, software of network based backup system 120 may operate to perform processing, such as image color correction, data correction, etc., with respect to the digital data files.

Network based backup system 120 of embodiments may additionally or alternatively operate to distribute or copy the digital data files as desired by a user. For example, software of network based backup system 120 may operate to push particular digital data files to various user equipment, such as to provide the most recent or current version of documents from a first user computer system (e.g., a desktop PC) to a second user computer system (e.g., a notebook PC) so the second user computer system is maintained without user interaction.

Similarly, software of network based backup system 120 may act in accordance with user preferences to distribute particular digital data files (e.g., digital photo albums) to one or more location (e.g., a MYSPACE account, a FACEBOOK account, etc.). Rather than distributing the digital data files, embodiments may provide access to the digital data files stored on mass storage systems of network based backup system 120, such as through hyper links, to thereby leverage the storage space provided by the mass storage systems.

At block 212 of the illustrated embodiment network based backup system 120 provides access to the backed up digital data files stored on mass storage systems of network based backup system 120. That is, having stored copies of the user's digital data files to mass storage systems of network based backup system 120, the illustrated embodiment allows access to those files to the appropriate user, user equipment, etc., such as through the use of a password protected network interface, a virtual drive interface implemented with respect to the user equipment, incremental backup software, and/or the like. For example, network based backup system 120 may provide a network portal having a document viewer, video player, video editor, photo viewer, photo editor, etc. for facilitating user assess and use of the digital data files stored by network based backup system 120.

Access to the digital data files provided by network based backup system 120 of embodiments facilitates various uses of and operations with the digital data files. For example, the user may from time-to-time supplement the backed up digital data files, such as through regularly scheduled and/or ad hoc incremental digital data file backup operations. Such incremental digital data file backup operations preferably provide for transmission of appropriate digital data files through a network link. Embodiments may employ incremental backups to backup files or file types from an initial backup that have been changed, added, etc., to provide a user an opportunity to have files which were selected not to be backed up in an initial backup to be backed up, etc. Additionally or alternatively, a user may access the digital data files stored by network based backup system 120 to restore data to user equipment, to transfer data to different user equipment, to remotely access data, etc.

Embodiments have been described with respect to a hybrid network based backup service providing initial transportation of a large volume of digital data files using a transport mass storage system and transportation of digital data files associated with incremental backups using network links. Embodiments of the invention, however, may provide for use of a transport mass storage system for some incremental digital data file backup operations. For example, where a large amount of data has been changed or added, and thus the incremental backup includes a large volume of digital data files, or where a subsequent "full" backup operation is performed to "refresh" the digital data files stored by network based backup system 120, embodiments may again utilize a transport mass storage system for transporting some or all digital data files to be backed up. Incremental backup software may, for example, request a transport mass storage system as set forth above with respect to block 203, and thereafter perform backup operations as set forth in blocks 205-211 above.

Although embodiments have been described herein with respect to transport mass storage system 100 providing transportation of digital data files for a user and associated user equipment, it should be appreciated that transport mass storage systems of embodiments may provide for transportation of digital data files for a plurality of user equipment and/or user accounts. For example, a single transport mass storage system may be utilized to copy digital data files from multiple user accounts on a same user equipment (e.g., WINDOWS based PC having multiple user accounts established thereon), such as by interfacing the transport mass storage system to the user equipment when logged in as different users. Similarly, a single transport mass storage system may be utilized to copy digital data files from a plurality of different user equipment. The various digital data files associated with such different user accounts and/or different user equipment may be managed using associated manifests (or a single aggregated manifest).

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:

associating a transport mass storage system with a user account of a network based backup service and with a user equipment mass storage system using a unique identifier of the transport mass storage system, the network based backup service providing a network backup service system operable to store backup copies of files from the user equipment mass storage system;

providing, by the network based backup service, the transport mass storage system for use with respect to the user equipment mass storage system;

verifying the user equipment mass storage system is associated with the transport mass storage system using the unique identifier of the transport mass storage system;

if the user equipment mass storage system and transport mass storage system association is verified, copying selected files from the user equipment mass storage system to the transport mass storage system;

transporting the transport mass storage system to a location associated with the network based backup system;

verifying the selected files copied to the transport mass storage system are associated with the user account of the network based backup service using the unique identifier of the transport mass storage system; and if the selected files and user account association is verified, copying the files from the transport mass storage system to a mass storage system of the network based backup system in association with the user account.

2. The method of claim 1, wherein the providing a transport mass storage system comprises:

shipping the transport mass storage system to a location for the copying the files from the user equipment mass storage system to the transport mass storage system.

3. The method of claim 2, further comprising:

providing for return shipping of the transport mass storage system.

4. The method of claim 1, wherein the providing a transport mass storage system comprises:
   making the transport mass storage system available at a depot location for a user to obtain.

5. The method of claim 1, wherein the providing a transport mass storage system comprises:
   installing code on the transport mass storage system, the code to be delivered by the transport mass storage system to user equipment associated with the user equipment mass storage system.

6. The method of claim 5, wherein the code comprises software for controlling the copying the files from the user equipment mass storage system.

7. The method of claim 5, wherein the code comprises user preferences regarding the files to be copied from the user equipment mass storage system.

8. The method of claim 5, wherein the code comprises information for verifying an authorized user performs the copying the files from the user equipment mass storage system.

9. The method of claim 5, wherein the code comprises information for verifying the user equipment mass storage system is a selected user equipment mass storage system.

10. The method of claim 5, wherein the code comprises a software upgrade for the user equipment associated with the user equipment mass storage system.

11. The method of claim 1, wherein the copying files from the user equipment mass storage system comprises:
   identifying files to be backed up to the network based backup system.

12. The method of claim 11, wherein the identifying files to be backed up comprises:
   using default file identification parameters.

13. The method of claim 11, wherein the identifying files to be backed up comprises:
   using file identification parameters established as a function of user preferences.

14. The method of claim 11, wherein the identifying files to be backed up comprises:
   using file identification parameters provided by a user.

15. The method of claim 1, wherein the copying files from the user equipment mass storage system comprises:
   encrypting the files before their storage upon the transport mass storage system.

16. The method of claim 1, further comprising:
   analyzing, under control of an instruction set executed by a processor, files of the user equipment mass storage system to determine file transportation information;
   determining, using the file transportation information, whether the files are to be transported to the network based backup system using the network link or the transport mass storage system;
   if the files are to be transported to the network based backup system using a transport mass storage system, performing the providing a transport mass storage system, the copying selected files from the user equipment mass storage system to the transport mass storage system, the transporting the transport mass storage system, and the copying the files from the transport mass storage system to a mass storage system of the network based backup system; and
   if the files are to be transported to the network based backup system using a network link copying the files from the user equipment mass storage system to the network based backup system using a network link.

* * * * *